(12) United States Patent
Nijenhuis et al.

(10) Patent No.: US 8,986,800 B2
(45) Date of Patent: Mar. 24, 2015

(54) COOKING BAG AND USE OF THE COOKING BAG FOR COOKING FOOD

(75) Inventors: Atze Jan Nijenhuis, Sittard (NL); Paul Willem Jan Van Den Heuvel, Maastricht (NL); Paul Alexander Moruzi, Northville, MI (US)

(73) Assignee: DSM IP Assets B.V., Heerlen (NL)

( * ) Notice: Subject to any disclaimer, the term of this patent is extended or adjusted under 35 U.S.C. 154(b) by 409 days.

(21) Appl. No.: 13/393,627

(22) PCT Filed: Sep. 7, 2010

(86) PCT No.: PCT/EP2010/063121
§ 371 (c)(1),
(2), (4) Date: Jun. 13, 2012

(87) PCT Pub. No.: WO2011/036051
PCT Pub. Date: Mar. 31, 2011

(65) Prior Publication Data
US 2012/0244268 A1    Sep. 27, 2012

(30) Foreign Application Priority Data

Sep. 22, 2009    (EP) .................................... 09170931

(51) Int. Cl.
| | | |
|---|---|---|
| B29D 22/00 | (2006.01) |
| B29D 23/00 | (2006.01) |
| B32B 1/08 | (2006.01) |
| B29C 65/00 | (2006.01) |
| C08G 63/553 | (2006.01) |
| C08G 63/16 | (2006.01) |
| C08G 69/34 | (2006.01) |
| A23L 1/01 | (2006.01) |
| B32B 1/02 | (2006.01) |

(52) U.S. Cl.
CPC ................ C08G 63/553 (2013.01); A23L 1/01 (2013.01); B32B 1/02 (2013.01); B32B 1/08 (2013.01); B65D 2581/34 (2013.01); B65D 2581/3416 (2013.01); C08G 63/16 (2013.01); C08G 69/34 (2013.01)
USPC .......... 428/35.5; 428/35.2; 426/393; 426/523

(58) Field of Classification Search
CPC .......... C08G 63/553; A23L 1/01; B32B 1/02; B32B 1/08; B29D 22/00; B29D 23/00; B29C 65/00
USPC ........................ 428/35.5, 35.2; 426/393, 523
See application file for complete search history.

(56) References Cited

U.S. PATENT DOCUMENTS

| | | |
|---|---|---|
| 3,716,369 A | 2/1973 | Perlman |
| 3,995,084 A | 11/1976 | Berger et al. |
| 2003/0021925 A1 | 1/2003 | Schmal et al. |
| 2006/0134287 A1 | 6/2006 | Vimini et al. |
| 2007/0077378 A1 | 4/2007 | Schmal et al. |

FOREIGN PATENT DOCUMENTS

| | | | |
|---|---|---|---|
| DE | 102004035401 | 2/2005 | |
| GB | 2421488 | 6/2006 | |
| JP | 02283450 A | * 11/1990 | .............. B32B 27/36 |

OTHER PUBLICATIONS

International Search Report for PCT/EP2010/063121 mailed Oct. 18, 2010.

* cited by examiner

*Primary Examiner* — Michael C Miggins
(74) *Attorney, Agent, or Firm* — Nixon & Vanderhye P.C.

(57) ABSTRACT

Cooking bag containing a copolymer containing monomer units of a dimerised fatty acid or a derivative thereof. Use the cooking bag for cooking food. A process for storing and cooking of food comprising the steps: a) filling the cooking with food, b) storing the filled cooking bag at a temperature below 0° C., c) cooking the food.

9 Claims, No Drawings

COOKING BAG AND USE OF THE COOKING BAG FOR COOKING FOOD

This application is the U.S. national phase of International Application No. PCT/EP2010/063121 filed 7 Sep. 2010 which designated the U.S. and claims priority to EP 09170931.1 filed 22 Sep. 2009, the entire contents of each of which are hereby incorporated by reference.

The invention relates to a cooking bag and the use of the cooking bag for cooking food.

Packaging and cooking of food in plastic bags or bags with a plastic liner is known. Such bags are used for storage of the food at low temperatures, often as low as −20° C., cooking at medium temperatures of about 100° C. and/or cooking at high temperatures of about 180° C.

Polyolefin bags and bags from copolyester elastomers containing polyether soft blocks like poly(THF) or polyalkylene oxides are used for packaging, storing at low temperatures and cooking at medium temperatures. For cooking at high temperatures these bags are not suitable, so that for that purpose the food must be repacked.

For cooking at high temperatures it is known to use polyamide cooking bags. However these bags have the disadvantage that after cooking of for example meat, the meat sticks to the bag. So during removal of the meat from the bag, the brown skin of the meat is at least partially left behind in the bag. This is highly unwanted and it puts restrictions on the use of polyamide cooking bags for the cooking of food.

Cooking bags of polyesters, such as for example polybutylene terephthalate and polyethylene terephthalate are known as well. Such cooking bags however have the disadvantage of failure during automated filling processes. Sealing of the bags, to close the bags, is often troublesome.

Object of the invention is to provide a strong cooking bag that does not show above mentioned problems.

Surprisingly this object is achieved by a cooking bag containing a copolymer containing monomer units of a dimerised fatty acid or a derivative thereof.

The cooking bag according to the invention is flexible and yet strong. Filling processes of the cooking bag run smooth, without or hardly without any failure of the cooking bag. The cooking bag is able to resist very high temperatures and is therefore suitable to be used for cooking food at 180° C. or even higher, while still being flexible under conditions of storage in a freezer. Also the meat does not stick to the bag after cooking, so that the integrity of the cooked product is maintained. This is highly surprising and very important, since not any one of the existing cooking bags was able to fulfill these severe conditions and by the inventors many materials were tested in vain.

The dimerised fatty acids may be obtained from monomeric unsaturated fatty acids by an oligomerisation reaction. The oligomer mixture is further processed, for example by distillation, to yield a mixture having a high content of the dimerised fatty acid. The double bonds in the dimerised fatty acid may be saturated by catalytic hydrogenation. The term dimerised fatty acid as it is used here relates to both types of these dimerised fatty acids, the saturated and the unsaturated. It is preferred that the dimerised fatty acids are saturated.

It is also possible that the copolymer of the cooking bag contains monomer units of derivatives of dimerised fatty acid. For example a dimerised fatty diol may be obtained as a derivative of the dimerised fatty acid by hydrogenation of the carboxylic acid groups of the dimerised fatty acid, or of an ester group made thereof. Further derivatives may be obtained by converting the carboxylic acid groups, or the ester groups made thereof, into an amide group, a nitril group, an amine group or an isocyanate group.

The dimerised fatty acids may contain from 32 up to 44 carbon atoms. Preferably the dimerised fatty acid contains 36 carbon atoms.

Further details relating to the structure and the properties of the dimerised fatty acids may be found in the corresponding leaflet "Pripol C36-Dimer acid" of the company UNICHEMA (Emmerich, Germany) or in the brochure of the Company COGNIS (Düsseldorf, Germany) "Empol Dimer and Poly-basic Acids; Technical Bulletin 114C (1997)".

In the production of the copolymer of the cooking bag the dimerised fatty acid can be used as a monomer or as a pre-cursor oligomer or polymer. In one example the pre-cursor polymer is a polyester, formed of dimerised fatty acid and/or dimerised fatty diol with any combination of diols or dicarboxylic acids. In another example the pre-cursor polymer is a polyamide, formed of dimerised fatty acid and/or dimerised fatty diamines with any combination of diamines or dicarboxylic acids forming polyamides. It is also possible that the pre-cursor polymer is a polyester-amide.

The copolymer of the cooking bag has in general a softening temperature, i.e. a glass transition temperature or a melting temperature, higher than 100° C., more preferably higher than 150, and even more preferably higher than 190° C., most preferably higher than 200° C. Preferably the copolymer has a semi-crystalline character, resulting in improved chemical resistance of the copolymer. Suitable copolymers for the cooking bag according to the invention include polyurethanes, polyamides or polyesters. The advantage of such copolymers is that is they are very suitable for the production of cooking bags with low wall thicknesses, with good properties, which bags can be obtained transparent or at least translucent.

Preferably the copolymer of the cooking bag is a polyester containing further monomer units of at least one dicarboxylic acid and at least one diol. The dicarboxylic acid may be aliphatic or aromatic. Suitable aliphatic dicarboxylic acids include oxalic acid, succinic acid, fumaric acid, suberic acid, sebacic acid and cyclohexane dicarboxylic acid. Suitable aromatic dicarboxylic acids include terephthalic acid, isophthalic acid, ortho-phthalic acid, naphthalene-dicarboxylic acid and para-phenylene dicarboxylic acid. Preferably at least one aromatic dicarboxylic acid is terephthalic acid or naphthalene dicarboxylic acid. Preferably at least 80 mol. %, more preferably at least 90 mol. %, most preferably at least 98 mol. % of the monomer units of dicarboxylic acids of the further monomer units are one or more aromatic dicarboxylic acids. The balance of the dicarboxylic acids of the further monomer units may contain of aliphatic dicarboxylic acids.

Suitable aliphatic diols include for example ethylene glycol, 1,3-propylene glycol, 1,4-butanediol, 1,6-hexanediol, neopentyl glycol, trimethylene glycol, tetramethylene glycol, cyclohexane dimethanol. An example of a suitable aromatic diol is 2,2-bis (4-hydroxyphenyl) propane. Sugar based diols, like for instance isosorbide, isomannite or isoidide may also be used. Preferably greater than 50, more preferably greater than 70, particularly greater than 90, and especially greater than 95 and up to 100 mole % of the diols are aliphatic glycol (s), preferably ethylene glycol and/or 1,4-butanediol.

In a particularly preferred embodiment of the invention, the further monomer units are 1,4-butanediol and terephthalic acid, ethylene glycol and terephthalic acid, ethylene glycol and naphthalene dicarboxylic acid, 1,4-butanediol and naphthalene dicarboxylic acid or mixtures thereof. Most preferably the further monomer units are 1,4-butanediol and terephthalic acid.

The copolymer of the cooking bag may further contains units of one or more polyether diols, for example poly(ethylene glycol), poly(propylene glycol), more particular poly-1,3-propylene glycol or poly-1,2-propylene glycol, poly(tetramethylene glycol), poly(hexamethyleneglycol), poly(ethylene glycol-tetramethylene glycol)copolymer, poly(ethylene glycol-propylene glycol)copolymers etc.

Preferably the copolymer consists of monomeric units of dimerised fatty acid and/or one or more derivatives thereof, 1,4-butanediol and terephthalic acid.

The ratio between the monomer units of dimerised fatty acid and/or one or more derivatives and the further monomer units in the copolymer of the cooking bag may in general vary between wide limits but is chosen particularly on the basis of the desired hardness of the copolymer. The hardness lies in general between 20 and 90 Shore D.

Preferably the copolymer contains between 2 and 40 wt. % of the monomer units of the dimerised fatty acid and/or a derivative thereof, more preferably between 5 and 30 wt. %, even more preferably between 10 and 20 wt. %. This ensures a high melting point of the copolymer and a high flexibility and good low temperature properties.

Examples of the preparation of such copolymers are described in for example Handbook of Thermoplastics, etc. O. Olabishi, Chapter 17, Marcel Dekker Inc., New York 1997, ISBN 0-8247-9797-3, in Thermoplastic Elastomers, 2nd Ed, Chapter 8, Carl Hanser Verlag (1996) ISBN 1-56990-205-4, in Encyclopaedia of Polymer Science and Engineering, Vol. 12, Wiley & Sons, New York (1988), ISBN 0-471-80944, p.75-117 and the references cited therein.

During or after the production of the copolymer additives may be added. These additives can function as anti-oxidants, UV-absorbers, nucleating agents, dies or pigments, inorganic or organic fillers, and anti-static agents. Stabilizers that can be used for example are hindered phenol antioxidants such as 1,3,5-trimethyl -2,4,6-tris(3,5,-di-t-butyl-4-hydroxybenzyl) benzene, and 3,9-bis{2-[3-(3-t-butyl-4-hydroxy-5-methylphenyl)-propionyloxyl-1,l-dimethylethyl}-2,4,8,10-tetraoxaspiro[5,5] undecane or stabilizers such as tris(2,4-di-t-butylphenyl)phosphite, trilauryl phosphite, 2-t-butyl-alpha-(3-t-butyl-4-hydroxyphenyl)-p-cumenyl-bis(p-nonylphenyl) phosphite, Examples of the above inorganic fillers are, for example, calcium carbonate, titanium oxide, mica, talc, and so on. Examples of the above ultraviolet absorbers include, for example, p-t-butylphenyl salicylate, 2-hydroxy-4-methoxybenzophenone, 2-hydroxy-4-methoxy-2'-carboxybenzophenone, 2,4,5-trihydroxy-butylophenone, and so on. Examples of the above nucleating agents are talcum, carboxylic acid salts like sodium benzoate and sodium stearate, titanium oxide and so on. Examples of anti-blocking agents are synthetic and natural silica's, talcum, zeolites and fatty amides.

The cooking bag may be produced with one of the usual processes for producing bags. One possibility is to use the cast film production process and to cut and to seal the film into bags. A preferred process is producing an annular film from the copolymer containing the monomer units of dimerised fatty acid and/or one or more derivatives by the film blow molding process and to cut and seal that film into bags. It is also possible to produce multilayer films by coextrusion, which films contain at least one layer, containing the copolymer containing the monomer units of the dimerised fatty acid.

The invention also relates to the use the cooking bag according to the invention for cooking food.

Preferably the cooking bag is used in a process comprising the steps:
a) filling the cooking bag according to the invention with food,
b) storing the filled cooking bag at a temperature below 0° C., preferably below −10° C.,
c) cooking the food, preferably at a temperature above 180° C., more preferably above 200° C.

The process according to the invention is especially suitable if the cooking bag is filled with meat or fish.

The invention is further explained by the examples, without being restricted by that.

Materials Used

Pripol™ 1009, hydrogenated dimerised fatty acid, delivered by Uniqema, containing about 98 wt. % of dimer fatty acid.

Pripol™ 1006, hydrogenated dimerised fatty acid, delivered by Uniqema, containing about 95 wt. % of dimer fatty acid.

Pripol™ 1013, non-hydrogenated dimerised fatty acid, delivered by Uniqema, containing about 95 wt. % of dimer fatty acid.

Arnitel™ EM 630, copolyetherester delivered by DSM, the soft segments are based on polytetrahydrofuran.

Arnitel™ EM 740, copolyetherester delivered by DSM, the soft segments are based on polytetrahydrofuran.

PET cooking bags. Toppits™ cooking bags, commercially available in the super markets.

Test Procedures

The melting point (Tm) was determined by DSC, using a Mettler DSC 828D. From a grain of granulate of the polymer about 8 mg of material was put in a sample holder. The material and sample holder were placed in the DSC apparatus, heated to 250° C. and cooled down to room temperature again, both at a rate of 10° C./min. Thereafter the temperature was raised by 10° C./min. The melting point was determined from the maximum of the peak of heat of crystallization.

The E-Modulus was determined at different temperatures by using a Rheometrics RSA-II DMS at a frequency of 1 Hz and heating rate of 5° C./min on samples of about 2.0 mm width, 0.09 mm thickness and length between clamps of about 21.8 mm, which method follows ASTM D5026. The E-modulus at 23° C. is reported. The samples were cut from a film obtained by drying granulate of the polymer for 16 hours at 110° C. under vacuum and producing the film by compression molding the granulate into the film at 250° C.

Preparation of the Copolymers

Copolymer 1 was prepared by adding 1,4-butane diol (453 g), dimethyl terephthalate (738 g) Pripol 1009 (150 g), TBT (0.5 g), Mg(OAc)$_2$4H$_2$O (0.3 g) into a 2 liter reactor. The pressure was reduced (20 mbar) 3 times followed by a nitrogen purge. At the first step the temperature is kept at 225° C. till all the formed methanol is removed from the medium in ~70 minutes under nitrogen at 1 atm. Last traces of methanol are removed by keeping the pressure at 100 mBar for 20 min. In the second step the temperature is increased to 240° C. to begin the polycondensation reaction and toward the end, finally the reaction is continued under high vacuum. At the second step, polycondensation occurs via transesterfication reaction and excess of the diol is distilled of during the second step. The reaction was stop while the torque reaches 65 N/cm for 25 rpm. When the polyesterification reaction is complete, copolymer 1 is removed while it is warm and it is quenched in water.

Copolymers 2 and 3 were produced likewise, however instead of Pripol™ 1009, Pripol™ 1006 and 1013 were used.

Preparation of Cooking Bags

Films were produced by extruding granulate of the polymers via a single screw extruder through an annular slit die and blow molding annular films having a diameter of 150 mm and a thickness of 50 microns, on standard blow molding equipment.

Bags were produced by cutting the films in length and sealing of the bottom.

Cooking Experiments

Bags, empty, or filled with chicken were placed for 2 hours in a hot air circulation oven at 204° C. (400° F.). The integrity of the bag was judged visually. PASS means that the bag was still in tact after the experiment, FAIL means that the bag was damaged after the experiment.

Comparative Experiments A, B, C and Examples 1-4

Arnitel EM630 and Arnitel EM 740 (comparative experiments A and B) and copolymers 1-3 (examples 1-3) were processed into cooking bags and the cooking bags were tested in a hot air oven. For the results see table 1. Also Tm and E-moduli of the polymers were measured and listed in table 1. In comparative experiment C the cooking bags of PET were tested in a hot air oven.

From the results it is clear that PET bags (comparative experiment A) pass the cooking test. However these bags fail in automated filling processes, because of brittle failure.

The bags produced from the copolyetheresters (comparative experiments A and B) and of the copolymers 1-3 (Examples 1-3) do not show this brittle failure. However, only the bags according to the invention (Examples 1-3) containing the copolymers containing the dimerised fatty acid passes the high temperatures of the cooking test.

TABLE 1

| | Comp. exp/Examples | | | | | |
|---|---|---|---|---|---|---|
| | A | B | 1 | 2 | 3 | C |
| Polymer | Arnitel EM630 | Arnitel EM740 | Co-polymer1 15 wt % Pripol 1009 | Co-polymer2 15 wt % Pripol 1006 | Co-polymer3 15 wt % Pripol 1013 | PET |
| Tm (DSC) | 212 | 219 | 213 | 215 | 212 | |

TABLE 1-continued

| | Comp. exp/Examples | | | | | |
|---|---|---|---|---|---|---|
| | A | B | 1 | 2 | 3 | C |
| Emod @ 23° C. [MPa] | 423 | 1290 | 755 | 778 | 842 | |
| Film thickness | 50 micron | 50 micron | 50 micron | 50 micron | 50 micron | |
| 2 hrs @ 400 F. w/o chicken | FAIL | FAIL | PASS | PASS | PASS | PASS |
| 2 hrs @ 400 F. w/i chicken | FAIL | | PASS | PASS | PASS | PASS |

The invention claimed is:

1. Cooking bag containing a copolymer containing monomer units of a dimerised fatty acid or a derivative thereof.

2. Cooking bag according to claim 1, wherein the copolymer has a hardness of between 20-90 shore D.

3. Cooking bag according to claim 1, wherein the copolymer contains between 2 and 40 wt. % monomer units of the dimerised fatty acid and/or a derivative thereof.

4. Use the cooking bag according to claim 1 for cooking food.

5. Cooking bag according to claim 1, wherein the copolymer is a polyester containing further monomer units of at least one dicarboxylic acid and at least one diol.

6. Cooking bag according to claim 5, wherein the further monomer units are monomer units of 1,4-butanediol and terephthalic acid.

7. Cooking bag according to claim 5, wherein the copolymer consists of monomer units of dimerised fatty acid and/or one or more derivatives thereof and monomer units of 1,4-butanediol and terephthalic acid.

8. Process for storing and cooking of food comprising the steps:
   a) filling the cooking bag according to claim 1 with food,
   b) storing the filled cooking bag at a temperature below 0° C.,
   c) cooking the food.

9. Process according to claim 8, wherein the food is cooked at a temperature above 180° C.

* * * * *